United States Patent [19]
Nemoto

[11] Patent Number: 5,975,189
[45] Date of Patent: Nov. 2, 1999

[54] METHOD OF FABRICATING A METALLIC ARTICLE USING A NON-SAND CORE

[75] Inventor: Masaru Nemoto, Gunma-prefecture, Japan

[73] Assignee: Suguru Nemoto, Gunma-prefecture, Japan

[*] Notice: This patent issued on a continued prosecution application filed under 37 CFR 1.53(d), and is subject to the twenty year patent term provisions of 35 U.S.C. 154(a)(2).

This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/329,093

[22] Filed: Oct. 25, 1994

Related U.S. Application Data

[62] Division of application No. 08/102,975, Jul. 28, 1993, abandoned.

[30] Foreign Application Priority Data

| Jul. 30, 1992 | [JP] | Japan | 4-64213 |
| Aug. 3, 1992 | [JP] | Japan | 4-248503 |
| Nov. 26, 1992 | [JP] | Japan | 4-339735 |
| Feb. 12, 1993 | [JP] | Japan | 5-47247 |
| Feb. 12, 1993 | [JP] | Japan | 5-47248 |
| Apr. 12, 1993 | [JP] | Japan | 5-108857 |

[51] Int. Cl.$^6$ .................................................. B22O 29/00
[52] U.S. Cl. ........................ 164/132; 164/138; 264/317
[58] Field of Search ............... 249/63, 64; 264/59, 264/219, 317; 164/47, 132, 138

[56] References Cited

U.S. PATENT DOCUMENTS

| 3,136,831 | 6/1964 | Zinn | 264/225 |
| 4,341,725 | 7/1982 | Weaver et al. | 264/28 |
| 4,424,183 | 1/1984 | Nelson | 264/221 |
| 4,446,906 | 5/1984 | Ackerman et al. | 164/112 |
| 4,560,523 | 12/1985 | Plumley et al. | 264/102 |
| 4,770,828 | 9/1988 | Rogier et al. | 264/56 |
| 4,900,491 | 2/1990 | Odink et al. | 264/59 |
| 5,052,463 | 10/1991 | Lechner et al. | 164/35 |
| 5,262,100 | 11/1993 | Moore et al. | 264/25 |

FOREIGN PATENT DOCUMENTS

| 0295819 | 12/1988 | European Pat. Off. . |
| 61-293646 | 12/1986 | Japan . |
| 826340 | 4/1958 | United Kingdom . |
| 949066 | 2/1964 | United Kingdom . |
| 1297992 | 11/1972 | United Kingdom . |
| 1325737 | 8/1973 | United Kingdom . |
| 2074065 | 10/1981 | United Kingdom . |
| 2130942 | 6/1984 | United Kingdom . |
| 2253170 | 9/1992 | United Kingdom . |
| 2258839 | 2/1993 | United Kingdom . |

OTHER PUBLICATIONS

Materials Handbook, Brady et al., 12th Edition, McGraw Hill, 1986.

*Primary Examiner*—Christopher A. Fiorilla
*Attorney, Agent, or Firm*—Lowe Hauptman Gopstein Gilman & Berner

[57] ABSTRACT

A method of producing a casting by using a plastic core. The plastic core is made of a thermoplastic resin and set in a casting mold so as to form a cavity in the casting mold. A molten metal such as aluminum is poured under pressure into the cavity to form the casting (product). The plastic core maintains its initial shape during casting. The remaining heat of the casting or the solidifying metal causes the plastic core to melt after the casting so that the molten plastic core is easily removed.

10 Claims, 4 Drawing Sheets

METHOD OF FABRICATING A METALLIC ARTICLE USING A NON-SAND CORE

This is a Divisional application of parent application Ser. No. 08/102,975, filed Jul. 28, 1993 now abandoned.

BACKGROUND OF THE INVENTION

1. Field of the Invention

This invention relates to improvements in a method of fabricating an article by using a non-sand core and an article produced thereby, and more particularly to a particular arrangement of the non-sand core to obtain a high quality article while facilitating a production process thereof.

2. Description of the Prior Art

Hitherto a variety of fabrication methods have been employed for metal, plastic and ceramic. Casting as a part of machining has been extensively used to fabricate metal. Injection molding is extensively used to fabricate or mold plastic or ceramic. In these fabrication processes of the above materials, a metal (non-disintegrative) core or a disintegrative core is generally used to fabricate articles having a hollow section and/or an undercut section.

The former metal core is used only in cases that the core can be directly extracted from a mold or extracted upon deformation of the fabricated article. Accordingly, use of the metal core is limited to a certain narrow range. The latter disintegrative core is usually formed of sand and therefore provided with the following disadvantages: The sand core is difficult to be formed to a predetermined shape and tends to easily disintegrate thereby rendering difficult handling thereof. Additionally, the sand core cannot meet conflicting requirements of compression resistance during fabrication and disintegration characteristics after the fabrication.

In this regard, it has been recently proposed in the field of casting of metal, to employ a sand core which is coated at its surface with a particular coating material so as to improve the compression resistance during casting. The coated sand core is used in a casting mold. However, even employment of such a coated sand core has the following difficulties:

(1) A plurality of layers of the coating material are required to be formed on the sand core, thereby making difficult formation of the coating layers. This troublesome operation increases the number of steps of a production process while increasing time and cost for the production process.

(2) It is difficult to completely remove binder as components of the coating material and the sand core, after casting. The removal of the binder is usually accomplished by burning or heat-treating the sand of the core. The burning step increases the number of steps of the production process while increasing time and cost for the production process.

(3) The sand core is difficult to be formed while requiring a complicated equipment and considerable steps in the production process. Additionally, the sand core tends to easily disintegrate and therefore is difficult in handling thereby increasing the number of steps in the production process while degrading the yield of the casting.

(4) During casting, a complicated pressure regulation is required to prevent the sand core from disintegrate. Additionally, it is difficult to completely disintegrate the sand core after the casting. The above requires a heat-treatment step for the sand core and a sand removing step, and an inspection step for removal of sand from the resultant casting (product), which increases the number of steps in the production process thus increasing time and cost for the production process.

(5) Penetration of molten metal into among sand particles of the sand core and penetration of components of the sand core into the casting (product) are made during the casting. These tend to produce small holes or cavities in the casting thereby degrading the yield and productivity of the casting (product).

(6) Complete removal of sand of the sand core is difficult after the casting, so that the sand remains attached on the casting (product) thereby causing wear and damage of the casting (product).

(7) It is difficult or substantially impossible to produce a complicated and/or large casting. This limits the application of casting methods using the sand core to a narrow range, thus providing troubles in designing and production of castings.

(8) Reuse of sand of the sand core is difficult because the sand core contains the coating materials and the binder which are difficult to be completely removed. For reuse of the sand of the sand core, further steps are required in the production process thereby increasing time and cost for the production process.

(9) The casting method using the sand core is usually accomplished with the following many steps which require increased production time and cost: (a) Forming a sand core; (b) Coating the sand core; (c) Drying the sand core; (d) Forming a casting mold; (e) Pouring a molten metal to accomplish a casting operation; (f) Removing sand from a casting (product); (g) Heat-treating the sand on the casting (product); (h) Inspecting completion of sand removing; (i) Removing burr from the casting (product); and (j) Obtaining a complete casting (product).

It will be understood that the above-discussed problems in the casting method are encountered also in the molding methods (using the sand core) for plastic and ceramic.

SUMMARY OF THE INVENTION

It is an object of the present invention to provide an improved method of fabricating an article by using a non-sand core and an article produced thereby, which overcome drawbacks encountered in conventional similar method and article.

Another object of the present invention is to provide an improved method of fabricating an article by using a non-sand core and an improved article produced thereby, by which high quality articles can be obtained while reducing the number of steps in a production process even if the article has the hollow and/or undercut shape.

An aspect of the present invention resides in a method of fabricating an article, comprising the following steps in the sequence set forth: forming a fabrication mold using a non-sand core formed of a non-sand material; and supplying a flowable material into the fabrication mold to fabricate an article.

Another aspect of the present invention resides in an article fabricated by a method comprising the following steps in the sequence set forth: forming a fabrication mold using a non-sand core formed of a non-sand material; and supplying a flowable material into the fabrication mold to fabricate the article.

A further aspect of the present invention resides in a core used in a fabrication mold for producing an article having at least one of hollow and undercut sections, the core being formed of a non-sand material.

According the principle of the present invention, the following advantageous effects are attained: (1) Using the non-sand core which does not tend to easily disintegrate facilitates fabrication of a core in a casting mold thereby simplifying a casting equipment and reducing the number of steps in a production process while reducing time and cost required in the production process. (2) The non-sand core does not tend to be easily broken even under rough handling and becomes easy in handling, thereby facilitating the carrying and storing thereof. Additionally, it makes unnecessary a pressure-regulation during the casting, thus reducing the number of steps in a production process while reducing time and cost required in the production process. (3) The non-sand core does not contain a component (such as binder) penetrating into the casting, and therefore no component is penetrated into the casting (product) thereby avoiding production of small holes or cavities in the casting (product). This prevents production of faulty products thereby improving the yield and the productivity of the casting (product), thus providing high quality castings (products). (4) The non-sand core makes easy formation of a hollow section and a undercut section of the casting (product). Additionally, it is improved in strength and therefore makes possible to produce the casting having a complete shape and full size regardless of the shape and the size, thus extending a casting application range. (5) The non-sand core is provided with both the pressure resistance or non-disintegration characteristics during the casting and the disintegration characteristics after the casting which characteristics conflict with each other. Accordingly, penetration of the molten metal into the casting (product) can be prevented while making unnecessary the pressure control during the casting. Additionally, the complete disintegration and removal of the non-sand core can be facilitated after the casting, thereby preventing the material of the core from being attached to the surface of the casting (product). This effectively avoids wear of the casting (product) and production of faulty products, thus providing the castings high in quality. (6) The non-sand core does not contain the component (such as the binder) difficult to be removed, and therefore it is easily reusable without troublesome treatment so as to prevent environmental pollution while reducing the number of steps in the production process and reducing time and cost required in the production process.

DESCRIPTION OF THE DRAWINGS

In the drawings, like reference numerals designate like parts and elements throughout all the figures: in which.

DETAILED DESCRIPTION OF THE INVENTION

Referring now to FIGS. 1 to 4, there is shown an embodiment of a method of fabricating an article by using a non-sand core, according to the present invention. According to this method, a non-sand core formed of a non-sand material (other than sand) is used to form a fabrication mold without using a sand core which has been extensively used. The non-sand core has been heretofore seemed to be impossible to be used as a core for the fabrication mold. The thus formed fabrication mold using the non-sand core is employed for production of a casting (product), fabrication of a plastic, or fabrication of a ceramic. The non-sand core is particularly suitable for fabricating an article having a hollow shape or a undercut shape. The non-sand core is required to have both a pressure resistance or non-disintegration characteristics during fabrication and a disintegration characteristics after the fabrication, the both characteristics conflicting with each other. Additionally, the non-sand core is preferably required not to affect the product during fabrication, i.e., not to have a characteristics to generate a large amount of gas.

Figure 1:
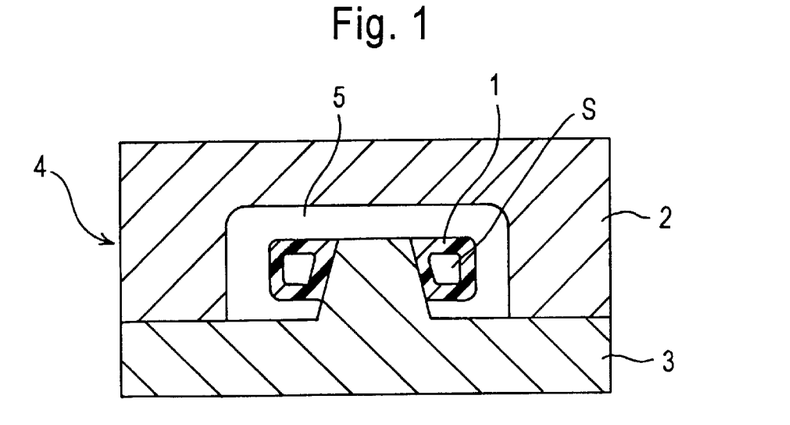
FIG. 1 is a cross-sectional view of a casting mold using a non-sand core, showing a first embodiment of the present invention.

The non-sand core 1 is preferably used in a casting mold to produce a casting (product) under casting, and preferably formed of a plastic or synthetic resin. Accordingly, discussion of the first embodiment will be made on a method (casting method) of producing the casting by using a plastic core (non-sand core) 1 formed of a plastic, under a die casting. In this embodiment, the plastic core 1 is produced by a plastic fabrication method such as an injection molding, to have a shape shown in FIG. 4 in which a hollow S is formed. The plastic core 1 is fixedly disposed between an upper mold part 2 and a lower mold part 3 in a manner as shown in FIG. 1 thereby obtaining a casting mold 4. As shown, the plastic core 1 is securely mounted on a part of the lower mold part 3. A cavity 5 is formed between the upper mold part 2 and the incorporated lower mold part 3 and the plastic core 1. The shape of the cavity 5 corresponds to that of a casting (product) 6 to be produced under casting.

Figure 2:
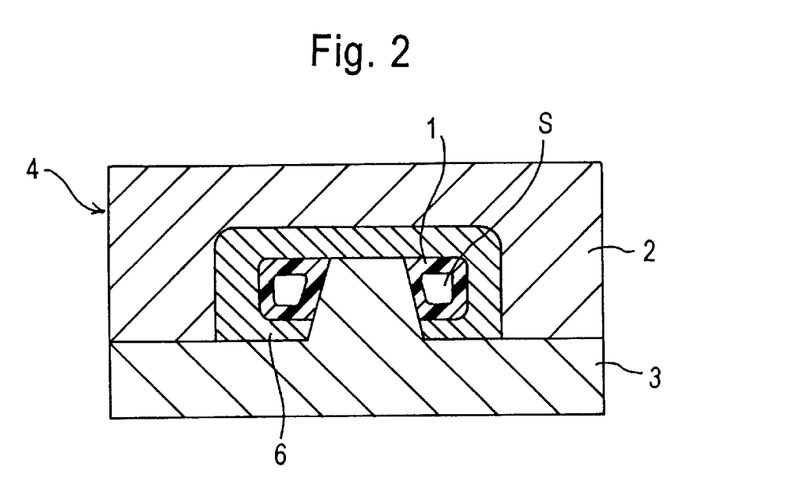
FIG. 2 is a cross-sectional view of the casting mold of FIG. 1 but showing a state in which a molten metal is filled in a cavity of the casting mold.

A molten metal of a metal material such as aluminum is poured under pressure into the cavity 5 formed in the casting mold 4 to obtain the casting (product) 6 having a shape corresponding to that of the cavity as shown FIG. 2. It will be understood that a variety of metals may be selected as the metal material of the molten metal so as to correspond to the material of the casting (product) to be produced.

Figure 3:
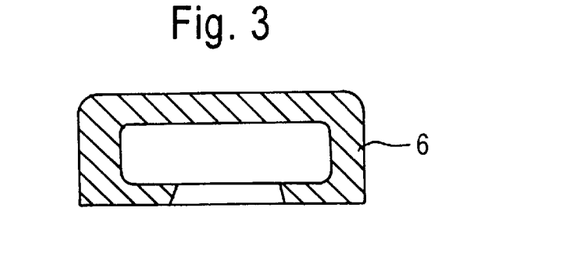
FIG. 3 is a cross-sectional view of a casting (product) taken out from the casting mold of FIG. 2.
Figure 4:
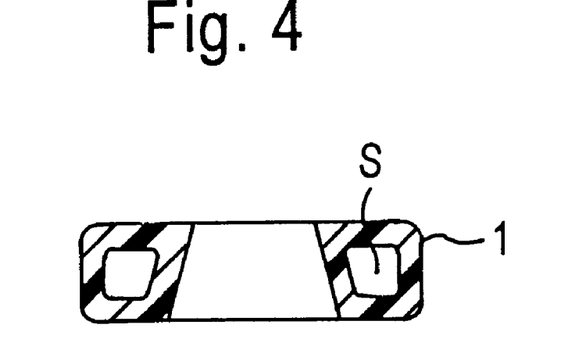
FIG. 4 is a cross-sectional view of the non-sand core used in casting and shown in FIGS. 1 and 2.

As shown in FIG. 3, the formed casting (product) 6 is taken out by opening the casting mold 4 thus completing a casting process. Thereafter, unnecessary portions such as burr are removed from the casting (product) thereby obtaining a resultant or complete casting 6 which is required. Such a casting method using the plastic core 1 effectively prevents casting defects such as small holes or cavities from being made during the casing, thereby providing the casting (product) which is improved in appearance and functional qualities. Additionally, the casting method of this instance (according to the present invention) omits many steps in an extensively used conventional casting method using a sand core. The conventional casting method usually includes the following ten steps: (1) Forming a sand core; (2) Coating the sand core; (3) Drying the sand core; (4) Forming a casting mold; (5) Pouring a molten metal to accomplish a casting operation; (6) Removing sand from a casting (product); (7) Heat-treating the sand on the casting (product); (8) Inspecting completion of sand removing; (9) Removing burr from the casting (product); and (10) Obtaining a complete casting (product). It will be understood that the above steps (2), (3), (4), (6), (7), (8) can be omitted and made unnecessary in the casting method of this embodiment of the present invention. As discussed above, according to the casting method of this embodiment of the present invention, the casting (product) can be effectively obtained in high quality while greatly reducing the number of steps in a casting process as compared with in the extensively used conventional casting method using the sand core.

The above mentioned plastic core 1 maintains its initial shape during casting (from a time of pouring the molten metal to a second time immediately after solidification of the molten metal) thereby to contribute to formation of the casting (product) to be required. However, the plastic core 1 is molten after casting under the action of remaining heat of the poured and solidifying molten metal, and removed after the casting (product) is taken out from the casting mold 4 so that there remains no residual material corresponding to the plastic core in the resultant casting (product). In the above casting method, the initial temperature (for example, about 660° C. in case of aluminum molten metal) of the poured molten metal is considerably lowered when the molten metal reaches the cavity 5 of the casting mold 4, which may lead to the fact that the plastic core 1 can maintain its initial shape even during the casting. Additionally, the plastic core 1 may maintain its initial shape under the action of temperature and latent heat of itself, so that it does not melt immediately upon pouring the molten metal. When a predetermined time has lapsed to allow the molten metal to be solidified after completion of pouring the molten metal into the cavity 5 of the casting mold 4, the plastic core 1 melts under the action of the remaining heat and finally removed.

As discussed above, the plastic core 1 is required to have both a pressure (compression) resistance or non-disintegration characteristics during the casting and a disintegration characteristics after the casting which characteristics conflict with each other, and preferably required not to affect the casting (product) during casting, i.e., not to have a characteristics to generate a large amount of gas. To meet these requirements, the plastic core 1 is, for example, formed of a thermoplastic resin. Suitable examples of the thermoplastic resin are polyfluoroethylene resin such as tetrafluoroethylene resin, polyimide resin, polyamideimide resin, and polysulfone resin. Polyamide resin (for example, "nylon" (trade name)) and polypropylene resin are also suitable examples of the thermoplastic resin. Furthermore, polyethylene resin and polyester resin ("Tetoron" (trade name)) are also suitable examples of the thermoplastic resin.

Furthermore, the plastic core 1 may be formed of a material other than the above listed thermoplastic resins, if the material meets the requirement to have both the pressure resistance or non disintegration characteristics during the casting and the disintegration characteristics after the casting which characteristics conflict with each other, and preferably meets the requirement not to affect the casting (product) during casting, i.e., not to have the characteristics to generate a large amount of gas. Examples of such a material are a thermosetting resin such as silicone resin, and a plastic (synthetic resin) other than those mentioned above. Moreover, it will be understood that the material of the non-sand core 1 is not limited to the plastic materials (synthetic resins) mentioned above, so that the non-sand core 1 may be formed of a metal having a low melting point or a ceramic (particularly one called "new ceramic" or "fine ceramic").

While the casting method of the present invention has been shown and described as being applied to the die casting, it will be understood that the principle of the casting method of the present invention may be also applied to a sand mold gravity casting, a metallic mold gravity casting, a low pressure casting, a precision casting, and the like.

Although the non-sand core 1 has been shown and described as being formed hollow from the view points of reducing weight and cost and facilitating disintegration and removal after casting, it will be appreciated that the shape the non-sand core 1 is not limited to such a hollow one so that the non-sand core 1 may be filled with its material without forming a hollow therein.

While the resultant casting (product) 6 has been shown and described as taking the shape indicated by FIG. 3, it will be understood that resultant castings (products) having a variety of shapes may be produced according to the casting method of the present invention.

Although only one example has been shown and described for the casting method of the present invention, it will be appreciated that modifications may be applied to the casting method in order to further improve the quality and the like of the resultant casting (product).

Hereinafter, advantageous effects of the first embodiment casting method of the present invention will be discussed.

(1) Using the non-sand core which does not tend to easily disintegrate facilitates fabrication of a core in a casting mold thereby simplifying a casting equipment and reducing the number of steps in a production process while reducing time and cost required in the production process.

(2) The non-sand core does not tend to be easily broken even under rough handling and becomes easy in handling, thereby facilitating the carrying and storing thereof. Additionally, it makes unnecessary a pressure-regulation during the casting, thus reducing the number of steps in a production process while reducing time and cost required in the production process.

(3) The non-sand core does not contain a component (such as binder) penetrating into the casting, and therefore no component is penetrated into the casting (product) thereby avoiding production of small holes or cavities in the casting (product). This prevents production of faulty products thereby improving the yield and the productivity of the casting (product), thus providing high quality castings (products).

(4) The non-sand core makes easy formation of a hollow section and a undercut section of the casting (product). Additionally, it is improved in strength and therefore makes possible to produce the casting having a complete shape and full size regardless of the shape and the size, thus extending a casting application range.

(5) The non-sand core is provided with both the pressure resistance or non-disintegration characteristics during the casting and the disintegration characteristics after the casting which characteristics conflict with each other. Accordingly, penetration of the molten metal into the casting (product) can be prevented while making unnecessary the pressure control during the casting. Additionally, the complete disintegration and removal of the non-sand core can be facilitated after the casting, thereby preventing the material of the core from being attached to the surface of the casting (product). This effectively avoids wear of the casting (product) and production of faulty products, thus providing the castings high in quality.

(6) The non-sand core does not contains the component (such as the binder) difficult to be removed, and therefore it is easily reusable without troublesome treatment so as to prevent environmental pollution while reducing the number of steps in the production process and reducing time and cost required in the production process.

Although the casting method has been shown and described as the first embodiment, it will be appreciated that the principle of the first embodiment may be applied to a plastic fabrication and a ceramic fabrication thereby to obtain a plastic article and a ceramic article which are high in quality while facilitating a production process therefor. In a case of plastic or ceramic fabrication, it is sufficient that the molten metal in the casting method of the second embodiment is replaced with a plastic or a ceramic. Additionally, it will be appreciated that the non-sand core of the present invention may be employed in a mold used in an injection molding as a method of fabricating a plastic or a ceramic, in which the non-sand core can provide advantageous effects similar to those in the casting while solving problems encountered in conventional corresponding techniques.

Although the non-sand core 1 has been shown and described as being made of a plastic in the first embodiment, it will be appreciated that the non-sand core 1 may be made of other materials such as a rubber, a fibrous material, a low melting point metal, a ceramic and a composite material. Examples of the rubber are natural rubber, synthetic rubber, silicone rubber, and fluorine-containing rubber. Examples of the fibrous material are paper, synthetic (plastic) paper, non-woven fabric, and fibers. Examples of the low melting point metal are tin, lead, and antimony. Examples of the composite materials are a fiber reinforced rubber (FRR), a fiber reinforced plastic (FRP), a carbon fiber reinforced plastic (CFRP), and a glass fiber reinforced plastic (GFRP).

Figure 5:
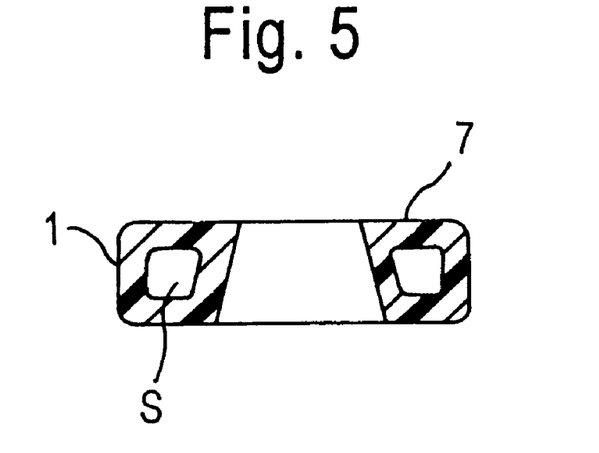
FIG. 5 is a cross-sectional view of a modified example of the non-sand core.

FIG. 5 illustrates a modified example of the plastic core 1, used in the above discussed casting method of the present invention. In this modified example, the plastic core 1 is coated at its surface with a heat resistant coating layer 7 which is made of a heat resistant plastic such as silicone rubber and silicone resin, a low melting point metal or a ceramic (called new or fine ceramic).

FIGS. 6 to 9 illustrate a second embodiment of the method of fabricating an article by using the non-sand core, in accordance with the present invention. This second embodiment fabrication method is similar to the first embodiment fabrication method of FIGS. 1 to 4, so that discussion will be made on a method (casting method) of producing the casting by using the plastic core (non-sand core) 1 under a die casting.

Figure 6:
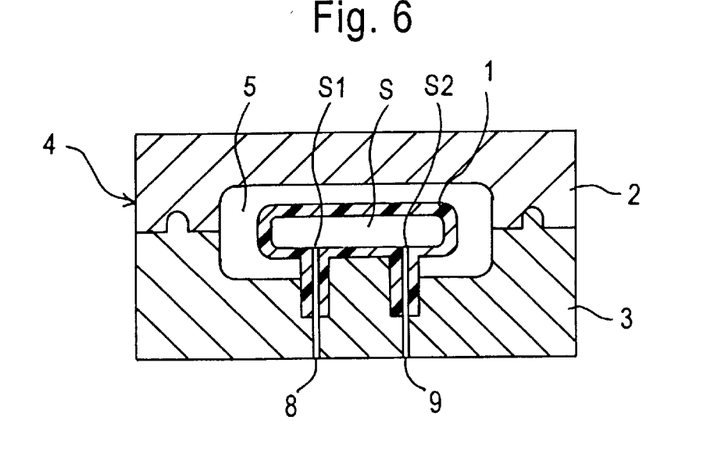
FIG. 6 is a cross-sectional view of a casting mold using a non-sand core, showing a second embodiment of the present invention.
Figure 9:
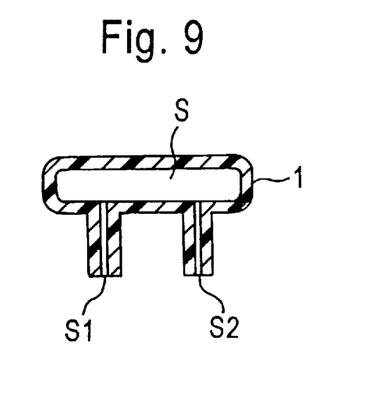
FIG. 9 is a cross-sectional view of the non-sand core used in casting and shown in FIGS. 6 and 7.

In this embodiment, the plastic core 1 is produced by a plastic fabrication method such as an injection molding, to have a shape shown in FIG. 9 in which a hollow S is formed. In this embodiment, a fluid such as a gas or a liquid is continuously flown through the hollow S, so that the hollow S serves as a fluid flowing chamber or passage. The plastic core 1 is formed with a fluid inlet S1 through which the fluid is flown into the hollow S, and a fluid outlet S2 through which the fluid is flown out of the hollow S. The plastic core 1 is fixedly disposed between an upper mold part 2 and a lower mold part 3, and mounted on the lower mold part 3 in such a manner that the fluid inlet and outlets S1, S2 of the plastic core 1 are respectively connected with fluid charging and discharging passages 8, 9 formed in the lower mold part 3 as shown in FIG. 6, thus obtaining a casting mold 4. It will be understood that the fluid is supplied through the fluid charging passage 8 while it is discharged through the fluid discharging passage 9. A cavity 5 is formed between the upper mold part 2 and the incorporated lower mold part 3 and the plastic core 1. The shape of the cavity 5 corresponds to that of a casting (product) 6 to be produced under the casting.

Figure 7:
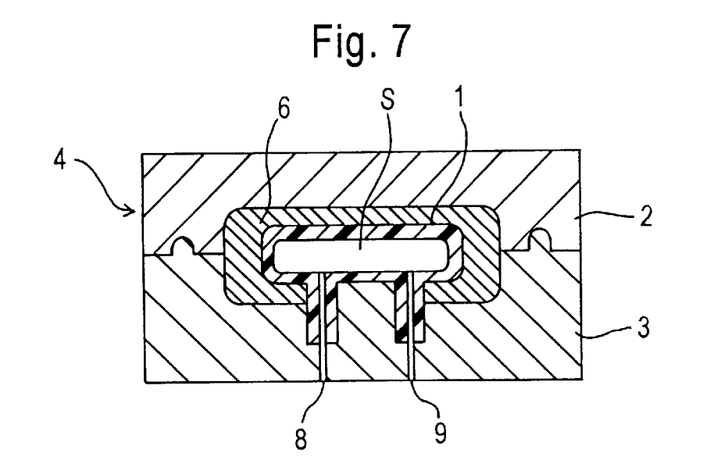
FIG. 7 is a cross-sectional view of the casting mold of FIG. 6 but showing a state in which a molten metal is filled in a cavity of the casting mold.

Upon completion of the casting mold 4, compressed air (as the fluid) in this embodiment is supplied from a compressor (not shown) and continuously flown through the hollow S in the plastic core 1. The compressed air is introduced into the hollow S through the above-mentioned fluid charging passage 8 and the fluid inlet S1, and is discharged from the hollow S through the above-mentioned fluid outlet S2 and the fluid discharging passage 9. Then, a molten metal of a metal material such as aluminum is poured into the cavity 5 formed in the casting mold 4 to obtain the casting (product) 6 having a shape corresponding to that of the cavity 5 as shown in FIG. 7. It will be understood that a variety of metals may be used as the metal material of the molten metal so as to correspond to the material of the casting (product) to be produced. During such casting or pouring the molten metal, the compressed air passing through the plastic core 1 compulsory cools the plastic core 1 while raising the pressure resistance of the plastic core 1 thereby to prevent deformation of the plastic core and maintain the initial shape of the plastic core 1.

Figure 8:
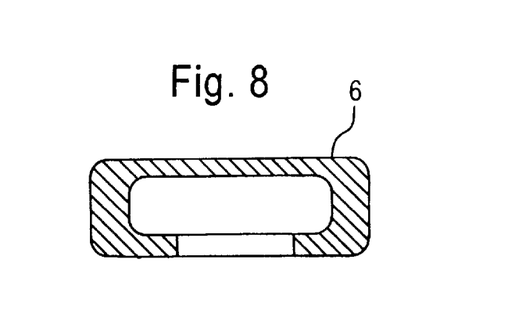
FIG. 8 is a cross-sectional view of a casting (product) taken out from the casting mold of FIG. 7.

As shown in FIG. 8, the thus formed casting (product) 6 is taken out by opening the casting mold 4 thus completing a casting process. Thereafter, unnecessary portions such as burr are removed from the casting (product) thereby obtaining a resultant or complete casting 6 which is required.

Thus, according to this embodiment, the plastic core 1 is compulsorily subjected to heat exchange or cooling by causing gas or liquid to continuously flow through the plastic core 1. Therefore, the plastic core 1 is greatly improved in heat resistance against the molten metal and in pressure resistance, so that the plastic core 1 is prevented from its deformation so as to maintain its initial shape even upon pouring high pressure molten metal during the casting.

The above discussed second embodiment can provide the following advantageous effects in addition to the same advantageous effects as those in the first embodiment:

(1) Since the fabrication (casting) of the article is carried out by flowing the cooling fluid through the inside of the non-sand core 1, it is sufficient that the non-sand core 1 has the pressure resistance, the heat resistance and the like under a condition the cooling fluid flows therein. Accordingly, conditions (such as the pressure resistance and the heat resistance) required to the non-sand core 1 are lightened thereby extending a range of selecting materials for the non-sand core 1.

(2) The pressure resistance and the heat resistance of the non-sand core 1 can be easily controlled by regulating a flow amount and a temperature of the fluid to be flown through the non-sand core 1.

Although the casting method has been shown and described as the second embodiment, it will be appreciated that the principle of the second embodiment may be applied to a plastic fabrication and a ceramic fabrication thereby to obtain a plastic article and a ceramic article which are high in quality while facilitating a production process therefor. In a case of plastic or ceramic fabrication, it is sufficient that the molten metal in the casting method of the second embodiment is replaced with a plastic or a ceramic. Additionally, it will be appreciated that the non-sand core of the present invention may be employed in a mold used in an injection molding as a method of fabricating a plastic or a ceramic, in which the non-sand core can provide advantageous effects similar to those in the casting while solving problems encountered in conventional corresponding techniques.

While a single fluid has been shown and described as the fluid to be flown through the non-sand core 1, it will be appreciated that a mixture of at least two gases, a mixture of at least two liquids or a mixture of at least a gas and a liquid may be used as the fluid to be flown through the non-sand core 1.

Figure 10:
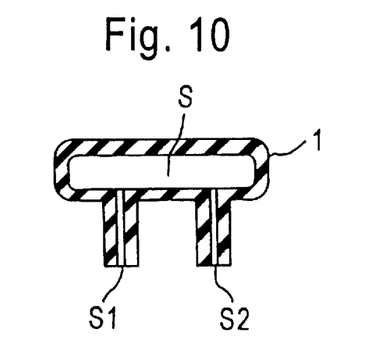
FIG. 10 is a cross-sectional view of a modified example of the non-sand core to be used in the casting mold of FIGS. 6 and 7.

FIG. 10 shows a modified example of the non-sand core 1 of the second embodiment of FIGS. 6 to 9. The non-sand core 1 of this example is similar to the plastic core 1 of the second embodiment but made of a rubber and therefore is referred to as a rubber core 1. Examples of the rubber are natural rubber, synthetic rubber, silicone rubber, and fluorine-containing rubber. It will be appreciated that the rubber core 1 of this example functions similarly to the plastic core 1 of the second embodiment of FIGS. 6 to 9.

Figure 11:
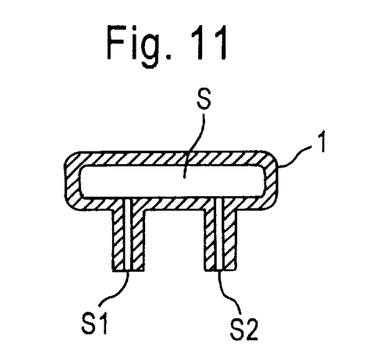
FIG. 11 is a cross-sectional view of another modified example of the non-sand core to be used in the casting mold of FIGS. 6 and 7.

FIG. 11 shows another modified example of the non-sand core 1 of the second embodiment of FIGS. 6 to 9. The non-sand core 1 of this example is similar to the plastic core 1 of the second embodiment but made of a fibrous material and therefore referred to as a fibrous core 1. Examples of the fibrous material are paper, synthetic (plastic) paper, non-woven fabric, and fibers. It will be understood that the fibrous core 1 of this example functions similarly to the plastic core 1 of the second embodiment of FIGS. 6 to 9.

Figure 12:
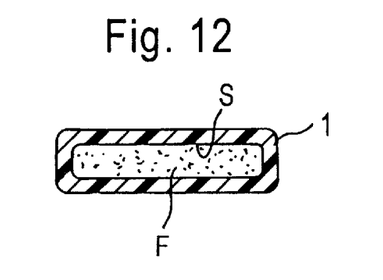
FIG. 12 is a cross-sectional view of a further modified example of the non-sand core to be used in the casting mold of FIGS. 1 and 2.

FIG. 12 shows a further modified example of the non-sand core 1 similar to that of the first embodiment. In this example, the non-sand core 1 made of the non-sand material such as a thermoplastic resin is formed therein with a hollow S which is filled with a filler F formed of an inorganic material such calcium carbonate powder, metal powder, silica lock powder, metal particles or balls. The filler F provides a pressure (compression) resistance and a heat resistance to the non-said core 1.

While the non-sand core 1 has been shown and described as being made of some materials, it will be appreciated that the non-sand core 1 may be made of other materials which can satisfy the conflictive conditions (the pressure resistance during fabrication and the disintegration characteristics after fabrication) under flowing of a cooling fluid through the non-sand core 1. Examples of such materials are a single material such as a low melting point metal and a ceramic, and a composite material. Examples of the low melting point metal are tin, lead, and antimony. Examples of the composite materials are a fiber reinforced rubber (FRR), a fiber reinforced plastic (FRP), a carbon fiber reinforced plastic (CFRP), and a glass fiber reinforced plastic (GFRP).

While the casting method of the second embodiment has been shown and described as being applied to the die casting, it will be understood that the principle of the casting method of the second embodiment may be also applied to a sand mold gravity casting, a metallic mold gravity casting, a low pressure casting, a precision casting, and the like.

It is to be noted that the principle of the casting method of the second embodiment is effectively applied to a gravity casting for the reasons set forth below.

In the gravity casting, a time for which molten metal is staying in a casting mold is long as compared with that of other castings. Accordingly, the non-sand core 1 is contacting with the molten metal for a relatively long time and therefore is required to have a high pressure resistance and a high heat resistance. In this regard, the non-sand core 1 of the second embodiment is subjected to a compulsory cooling thereby ensuring the high pressure resistance and high heat resistance.

Such a gravity casting is accomplished by the same apparatus and in the same manner as those shown in FIGS. 6 to 9, providing the same advantageous effects. Accordingly, the detailed explanation of this gravity casting is omitted for the purpose of simplicity of illustration.

What is claimed is:

1. A method comprising the following steps in the sequence set forth:

forming a fabrication mold using a non-sand core formed of a non-sand material; and supplying a molten metal into said fabrication mold to fabricate a metallic article;

wherein said non-sand material consists essentially of plastic and wherein said plastic is one selected from the group consisting of a thermoplastic resin and a thermosetting resin; and wherein said non-sand material has properties which provide said non-sand core with a compression resistance sufficient to withstand a pressure during supply of said molten metal into said fabrication mold, and which provide said non-sand core with a disintegration characteristic so that said non-sand core is disintegrated for removal from said fabrication mold after the fabrication of said metallic article.

2. A method as claimed in claim 1, further comprising disintegrating said non-sand core under a remaining heat of said molten metal upon solidification of said molten metal after the molten metal supplying step.

3. A method as claimed in claim 2, further comprising removing said non-sand core from the fabricated metallic article after the non-sand core disintegrating step.

4. A method as claimed in claim 1, wherein said plastic is thermoplastic resin, and wherein said thermoplastic resin is one selected from the group consisting of polyfluoroethylene resin, polyimide resin, polyamideimide resin, polysulfone resin, polyamide resin, polypropylene resin, polyethylene resin, and polyester resin.

5. A method as claimed in claim 1, wherein said plastic is thermosetting resin, and wherein said thermosetting resin is silicone resin.

6. A method as claimed in claim 1, wherein said molten metal is aluminum.

7. A method comprising the following steps in the sequence set forth:

forming a fabrication mold using a non-sand core formed of a non-sand material; and supplying a molten metal into said fabrication mold to fabricate a metallic article;

wherein said non-sand material consists essentially of rubber, and wherein said rubber is one selected from the group consisting of natural rubber, synthetic rubber, silicone rubber, and fluorinecontaining rubber; and wherein said non-sand material has properties which provide said non-sand core with a compression resistance sufficient to withstand a pressure during supply of said molten metal into said fabrication mold, and which provide said non-sand core with a disintegration characteristic so that said non-sand core is disintegrated for removal from said fabrication mold after the fabrication of said metallic article.

8. A method comprising the following steps in the sequence set forth:

forming a fabrication mold using a non-sand core formed of a non-sand material; and supplying a molten metal into said fabrication mold to fabricate a metallic article;

wherein said non-sand material consists essentially of fibrous material, and wherein said fibrous material is one selected from the group consisting of paper, non-woven fabric, and fibers; and wherein said non-sand material has properties which provide said non-sand core with a compression resistance sufficient to withstand a pressure during supply of said molten metal into said fabrication mold, and which provide said non-sand core with a disintegration characteristic so that said non-sand core is disintegrated for removal from said fabrication mold after the fabrication of said metallic article.

9. A method of fabricating a metallic article, comprising the following steps in the sequence set forth:

forming a fabrication mold using a non-sand core formed of a non-sand material; and supplying a molten metal into said fabrication mold to fabricate a metallic article;

wherein said non-sand material consists essentially of composite material, and wherein said composite material is one selected from the group consisting of a fiber reinforced rubber and a fiber reinforced plastic; and wherein said non-sand material has properties which provide said non-sand core with a compression resistance sufficient to withstand a pressure during supply of said molten metal into said fabrication mold, and which provide said non-sand core with a disintegration characteristic so that said non-sand core is disintegrated for removal from said fabrication mold after the fabrication of said metallic article.

10. A method of producing a casting, comprising the following steps in the sequence set forth:

forming a casting mold using a non-sand core formed of a non-sand material, said non-sand material having properties which provide said non-sand core with a compression resistance sufficient to withstand a pressure during pouring of a molten metal into said casting mold, and which provide said non-sand core with a disintegration characteristic so that said non-sand core is disintegrated for removal from said casting mold after the pouring of said molten metal, said non-sand material being a thermoplastic resin;

pouring the molten metal into a cavity of said casting mold to produce a casting upon solidification of said molten metal; and allowing said non-sand core to melt under a remaining heat of said molten metal after producing said casting in said pouring step, and then removing said non-sand core while molten.

* * * * *